United States Patent [19]

Purser

[11] Patent Number: 5,120,956
[45] Date of Patent: Jun. 9, 1992

[54] ACCELERATION APPARATUS WHICH REDUCED BACKGROUNDS OF ACCELERATOR MASS SPECTROMETRY MEASUREMENTS OF $^{14}$C AND OTHER RADIONUCLIDES

[75] Inventor: Kenneth H. Purser, Lexington, Mass.

[73] Assignee: High Voltage Engineering Europa B.V., Amersfoort, Netherlands

[21] Appl. No.: 696,239

[22] Filed: May 6, 1991

[51] Int. Cl.$^5$ .................... H01J 49/28; B01D 59/46
[52] U.S. Cl. ................... 250/281; 250/282; 313/360.1; 328/233
[58] Field of Search .............. 250/281, 282; 313/360.1; 328/233

[56] References Cited

U.S. PATENT DOCUMENTS

| | | | |
|---|---|---|---|
| 2,922,905 | 1/1960 | van de Graaff | 313/360.1 |
| 3,308,323 | 3/1967 | van de Graaff | 313/360.1 |
| 3,402,310 | 9/1968 | Howe et al. | 313/360.1 |
| 4,037,100 | 7/1977 | Purser | 250/281 |

Primary Examiner—Jack I. Berman
Assistant Examiner—Kiet T. Nguyen
Attorney, Agent, or Firm—Nields & Lemack

[57] ABSTRACT

Backgrounds of AMS measurements are reduced by eliminating unwanted charged particles which undergo charge change during the acceleration process. This reduction is accomplished by a configuration of inclined electric fields throughout the acceleration region.

2 Claims, 3 Drawing Sheets

ACCELERATION APPARATUS WHICH REDUCED BACKGROUNDS OF ACCELERATOR MASS SPECTROMETRY MEASUREMENTS OF $^{14}$C AND OTHER RADIONUCLIDES

BACKGROUND OF THE INVENTION

1. Field of the Invention

This invention relates to accelerator mass spectrometry (AMS), wherein negative ions are formed from a sample to be analyzed and are accelerated in a tandem accelerator to a high-voltage terminal maintained at a high positive potential. A stripper within the high-voltage terminal converts the negative ions to a positive charge state and induces dissociation of all background molecules. After further acceleration and mass analysis, the particles to be analyzed are detected and their properties measured.

2. Description of the Prior Art

During the past twelve years, detection efficiency for long-lived isotopes has been dramatically improved by applying the techniques of Accelerator Mass Spectrometry (AMS). Using AMS, the presence of a radioactive nucleus is detected, not by waiting for it to make a radioactive transformation, but rather by searching for the unstable atoms themselves. The basic principles of AMS instrumentation have been described by Kenneth H. Purser in U.S. Pat. NO. 4,037,100 and by Kenneth H. Purser, R. B. Liebert and C. J. Russo in Radiocarbon 22, (1980) 794.

Measurements of $^{14}$C are good examples of the improvements that are possible using AMS. As a specific example, in a milligram sample of modern carbon (from recent wood or animal products) there are approximately $5.10^7$ $^{14}$C nuclei. The $^{14}$C nuclei from this milligram disintegrate at a rate of approximately 0.8 disintegrations per hour. In contrast, if using the same sample, AMS procedures were used to count individual $^{14}$C nuclei, it is possible to detect reliably more than 2% of the total $^{14}$C nuclei present and at a rate greater than 150 events/second. Only a few minutes are needed to measure $^{14}$C/$^{12}$C ratios with a precision better than 1%.

A diagram showing the elements of a typical tandem AMS system is shown in FIG. 1. It can be seen that the instrument includes (1) An ion source from which C− beams can be generated. (2) A tandem accelerator where all the injected ions are simultaneously accelerated to an energy between 2.0 and 2.5 MeV. (3) A gas cell or foil stripper which converts the negative ions to a positive charge state and induces dissociation of all background molecules. (4) A second acceleration stage. (5) A post acceleration mass analysis section where a combination of electric and magnetic deflections eliminates unwanted particles. (6) An ionization detector which independently checks the identity of each arriving particle by measurements of kinetic energy and the rate of energy loss.

ACCURACY

For most applications, high accuracy is essential for the measured isotopic ratios. While the present state of the art is that fractionation-corrected $^{14}$C/$^{12}$C isotopic ratios can be measured with an accuracy of ~0.6%, in the near future 0.2% accuracies will be needed and this accuracy can best be achieved by accelerating all three isotopes simultaneously. Simultaneous injection of all three 12-13-14 carbon isotopes ensures that the three beam envelopes are identical and that uncertainties in the ratios, originating from ion optical aberrations, beam loading and mistuning of the accelerator, can be largely avoided.

BACKGROUNDS

One fundamental problem when AMS measurements of all three isotopes are made simultaneously, is that the post-acceleration analysis system must operate at very large mass abundance ratios ($>>10^{12}$) without introducing significant background contributions form wall scattering and charge changing collisions. As an example of the magnitude of the problem, if a very old sample of carbon is being measured in a system similar to that of FIG. 1, more than 20 particle microamperes ($3.10^{14}$ ions/sec) of the stable carbon isotopes can be introduced into the high energy mass spectrometer at the same time that $^{14}$C ions are being measured at a rate of only a few per minute. Clearly, charge changing, wall and gas scattering must all be carefully controlled if very low probability sequences are not to cause unwanted particles to enter the detector.

For the case of a tandem operating at a terminal voltage of 2.5 MV, the most significant backgrounds come from $^{12}$C$^{3+}$ and $^{13}$C$^{3+}$ ions having the same magnetic rigidity as that of 10 MeV $^{14}$C$^{3+}$ ions (15.56 MeV-AMU). Ions of any mass having this magnetic rigidity can travel through magnetic fields along identical trajectories to that of the wanted ions and are not attenuated.

The most intense contribution to the above type of background is initiated by $^{12}$C and $^{13}$C ions which leave the high voltage terminal in a 4+ charge state and subsequently charge change to a 3+ charge state within the electrostatic acceleration fields, as shown in FIG. 2. The consequence of this process is the generation of a 'white' spectrum of $^{12}$C$^{3+}$ ions having an energy continuum between 10 MeV and 12.5 MeV. While most of these particles are intercepted at analysis slits at the exit from the first magnetic element, there is a small momentum slice which passes through these defining slits and is transmitted without attenuation into the succeeding elements of the high energy mass spectrometer. Normally, an electrostatic deflector is one of these elements and such a deflector will not transmit these particles to the detector because the energy is incorrect. However, rare charge changing sequences are possible in principle, allowing unwanted events to enter the detector. Because the primary $^{13}$C beam intensity is high ($\sim 10^{12}$/sec), and the cross sections for 4+ to 3+ interactions are of order $2.10^{-17}$ cm$^2$, (see Betz in Methods of Experimental Physics 17, 98), the transmitted momentum slice may be as intense as $10^8$sec. that are injected into the following $^{14}$C channel.

SUMMARY OF THE INVENTION

In the present disclosure, this class of potential ME/q$^2$ ambiguities is greatly attenuated by using an inclined field structure similar to the secondary particle suppression apparatus described by Van de Graaff in U.S. Pat. No. 3,308,323. To apply the principles described by Van de Graaff to the acceleration of ions, it is desirable to arrange that those ions which start on-axis and pass through the inclined field structure also exit on-axis of the tube and with zero angular deflection.

BRIEF DESCRIPTION OF THE DRAWINGS

The invention may best be understood from the following detailed description thereof, having reference to the accompanying drawings, in which.

DESCRIPTION OF THE PREFERRED EMBODIMENT

Figure 3:
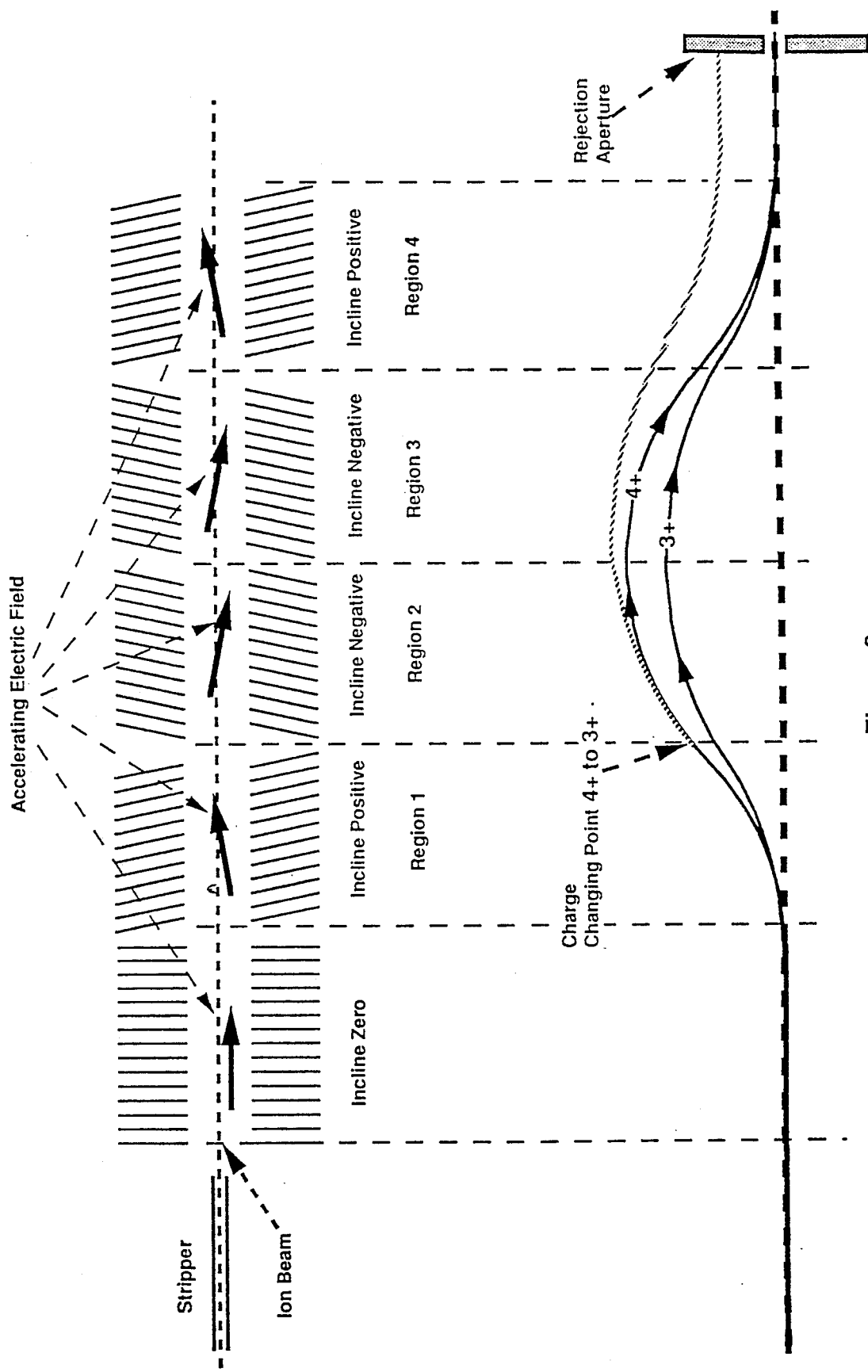
FIG. 3 is a diagram similar to those of FIGS. 1 and 2 showing in even greater detail than that of FIG. 2 the operation of the system of the invention.

In the present disclosure, this class of potential $ME/q^2$ ambiguities is greatly attenuated by using an inclined field structure similar to the secondary particle suppression apparatus described by Van de Graaff in U.S. Pat. No. 3,308,323. To apply the principles described by Van de Graaff to the acceleration of ions, it is desirable to arrange that those ions which start on-axis and pass through the inclined field structure also exit on axis of the tube and with zero angular deflection. FIG. 3 shows an example of an inclined field geometry which satisfies this condition. It can be seen that four stages of inclined field are needed to simultaneously cancel the introduced radial velocity and central ray displacement. Basically, the radial impulse present in region 1 is canceled by an equal and opposite radial impulse in region 2. The radial displacement present at the exit of region 2 is removed by a symmetrical set of radial impulses imposed within sections 3,4.

CHARGE CHANGING

Figure 1:
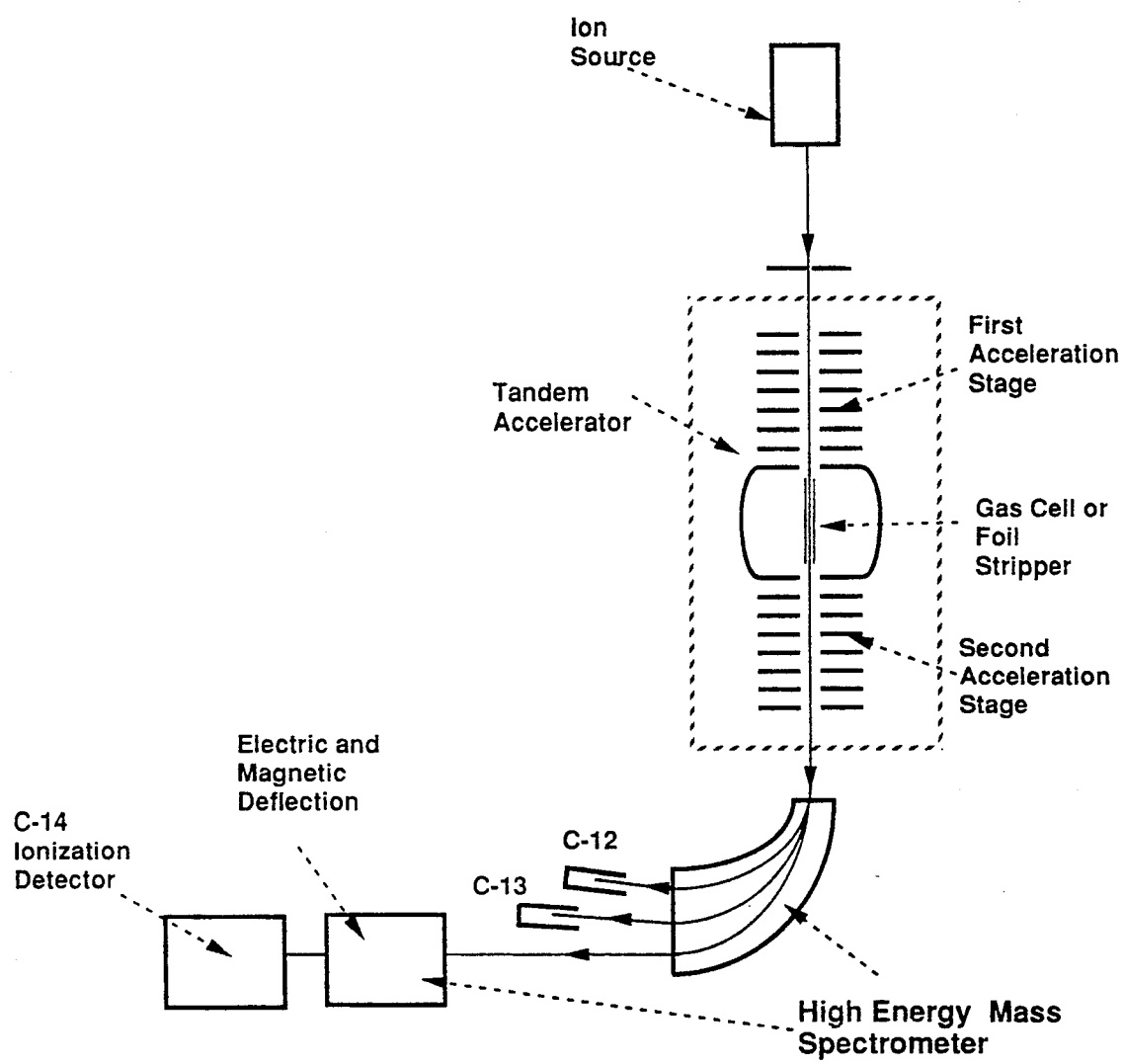
FIG. 1 is a diagram showing the elements of a typical tandem AMS system.
Figure 2:
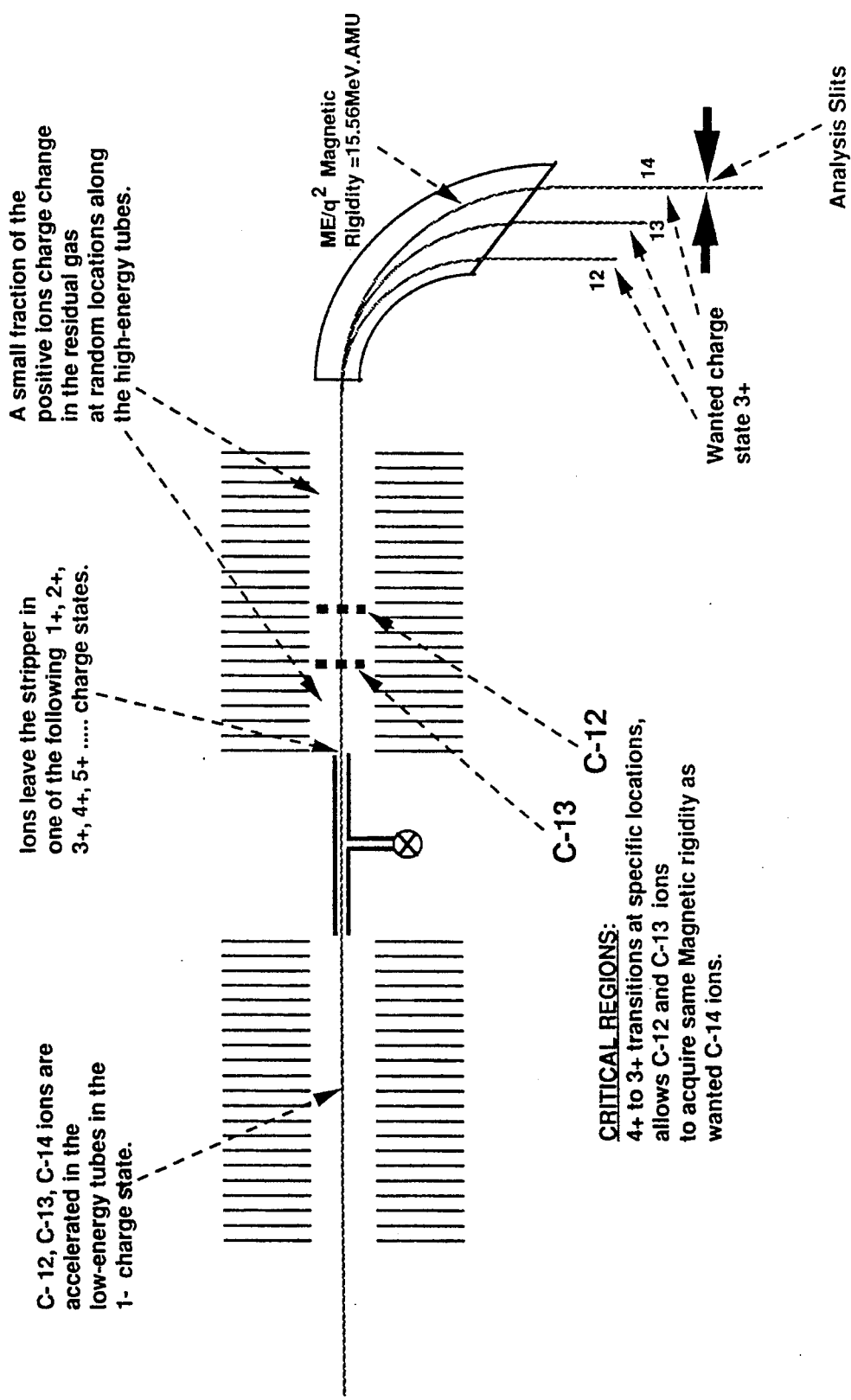
FIG. 2 is a diagram similar to that of FIG. 1 showing in greater detail portions of the system of FIG. 1.

For those ions which suffer charge change within the high energy acceleration tube, the symmetry requirements of the radial impulses described above are no longer satisfied and, in general, such ions exit with non-zero angular and radial coordinates. Considering the special case shown in FIG. 2, where the $ME/q^2$ contribution comes from particles which leave the high voltage terminal in a 4+ charge state and subsequently charge change within the acceleration fields to a 3+ charge state, there is only a short region where such charge changing will actually produce ions having the magnetic rigidity need to pass through the analysis slits following the first magnet. The locations differ slightly for C-12 and C-13.

Referring back to FIG. 3, it will be seen that, if the tube design is such that the above critical region for C-13 can be located at or close to the intersection point between sections 1 and 2, the radial impulse integrated over section 1 for these unwanted background ions will no longer be completely compensated by the impulse received in section 2. The effect is that an angular deflection will be introduced only to the charge changed ions and these unwanted particles can be rejected later at a suitable aperture. It will be clear to those skilled in the art that these same principles can be adapted to other charge changing problems.

For calculating the lengths of each radial section, it is useful to note that the individual lengths of the regions shown in FIG. 3 must scale with velocity if the radial impulses for the wanted ions are to cancel. For those skilled in the art calculating a good first approximation to a charge exchange rejection geometry with the above constraints can be carried out rapidly using a hand calculator. Computer programs can also be readily written which will allow the calculations to be made with higher precision.

Other Isotopes: While the present disclosure uses as examples $^{14}C$ backgrounds, it will be clear to those skilled in the art that this background rejection technique can easily be applied to measurements involving other isotopes.

Having thus described the principles of the invention, together with several illustrative embodiments thereof, it is to be understood that although specific terms are employed, they are used in a generic and descriptive sense, and not for purposes of limitation, the scope of the invention being set forth in the following claims.

I claim:

1. A method of reducing background of accelerator mass spectrometry measurements caused by charged particles undergoing charge change during acceleration by an accelerating electric field at a known region of space, which method comprises (1) imposing a first symmetrically reversed lateral electric field at a location such that the place of field reversal occurs in said region of space, (2) imposing an oppositely oriented, second, symmetrically reversed lateral electric field at a region traversed by the accelerated particles after traversing said first symmetrically reversed lateral electric field, whereby particles undergoing no charge change wile passing through said lateral electric fields resume their previous trajectory, whereas particles undergoing charge change while passing through said lateral electric fields deviate from their previous trajectory, and (3) removing particles having such a deviate trajectory.

2. Apparatus for reducing background of accelerator mass spectrometry measurements caused by charged particles undergoing charge change during acceleration by an accelerating electric field at a known region of space, which method comprises (1) means for imposing a first symmetrically reversed lateral electric field at a location such that the place of field reversal occurs in said region of space, (2) means for imposing an oppositely oriented, second, symmetrically reversed lateral electric field at a region traversed by the accelerated particles after traversing said first symmetrically reversed lateral electric field, whereby particles undergoing no charge change wile passing through said lateral electric fields resume their previous trajectory, whereas particles undergoing charge change while passing through said lateral electric fields deviate from their previous trajectory, and (3) an aperture plate having an aperture adapted to block particles other than those having said trajectory.

* * * * *